United States Patent

Sommermeyer

[15] 3,690,461

[45] Sept. 12, 1972

[54] FILTER AND HOUSING FOR THE SAME

[72] Inventor: Heinrich Sommermeyer, Gera, Germany

[73] Assignee: Heinrich Sommermeyer KG, Gera, Germany

[22] Filed: Nov. 27, 1970

[21] Appl. No.: 93,317

[30] Foreign Application Priority Data

April 6, 1970 France.....................7012397

[52] U.S. Cl.................................210/222
[51] Int. Cl. ............................B01d 35/06
[58] Field of Search......210/222, 223, 361, 398, 455, 210/470, 489, 282, 233, 489, 490

[56] References Cited

UNITED STATES PATENTS

| 1,426,836 | 8/1922 | Neumeyer.................210/222 |
| 830,286 | 9/1906 | Bell........................210/489 X |
| 1,044,601 | 11/1912 | Thiem....................210/489 X |
| 3,463,729 | 8/1969 | Bean......................210/222 X |

Primary Examiner—Reuben Friedman
Assistant Examiner—T. A. Granger
Attorney—Nolte and Nolte

[57] ABSTRACT

A filter for removing impurities from fluids. The filter housing is generally rectangular in cross-section, or, more generally is of prismatic shape, facilitating combination with flat end surfaces of cabinets, appliances and devices cooperating with the filter.

3 Claims, 2 Drawing Figures

PATENTED SEP 12 1972　　3,690,461

HEINRICH SOMMERMEYER
INVENTOR

BY
Nolte & Nolte
ATTORNEYS

FILTER AND HOUSING FOR THE SAME

BACKGROUND OF THE INVENTION

In fluid filter, a filter body is used most frequently which has an approximately circular cross-section. The reason for this lies partially in the requirements of fluid flow and also in the ease of manufacturing such circular bodies. Usually, the form of the filter body is brought in agreement with the inner space of the filter housing and this space, in turn, determines the outer shape of the filter housing. As a result the most commonly used filter housings have had a circular cross-section, thus providing the general shape of a cylindrical column.

Such filters could not easily blend into the general shape of the machines, appliances and devices with which they were used. The filters presented a clumsily appearing body, and made a misfitting appearance with flat, smooth and contourless surfaces of the units with which they were used. Further, as the shape of such filters did not allow the designer to blend them harmonically in the general shape of the end product, the filters often were placed in an obscure or poorly accessible place, and the servicing of the filters was difficult.

SUMMARY OF THE INVENTION

It is, therefore, the object of the present invention to provide a flow filter of relatively small size and which nevertheless provides good applicability to the surface of the commercial product.

According to the present invention, a filter is provided with a housing of square or rectangular cross-section, whereby the filter becomes very easily applicable to the flat surface of an appliance or similar unit. Such shape also permits an end-chamber for certain filter types to be enlarged, with resulting improved flow conditions, while not increasing the overall dimensions of the filter.

BRIEF DESCRIPTION OF THE DRAWINGS:

The invention will become more readily apparent from the following description of a preferred embodiment thereof shown, by way of example, in the accompanying drawing, in which.

Figure 1:
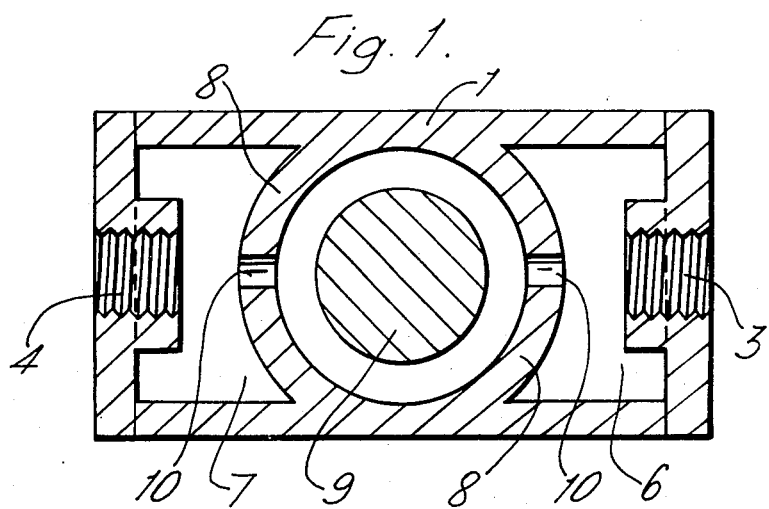
FIG. 1 is a cross-sectional view of a filter according to the present invention, having a magnetic filter body therein.
Figure 2:
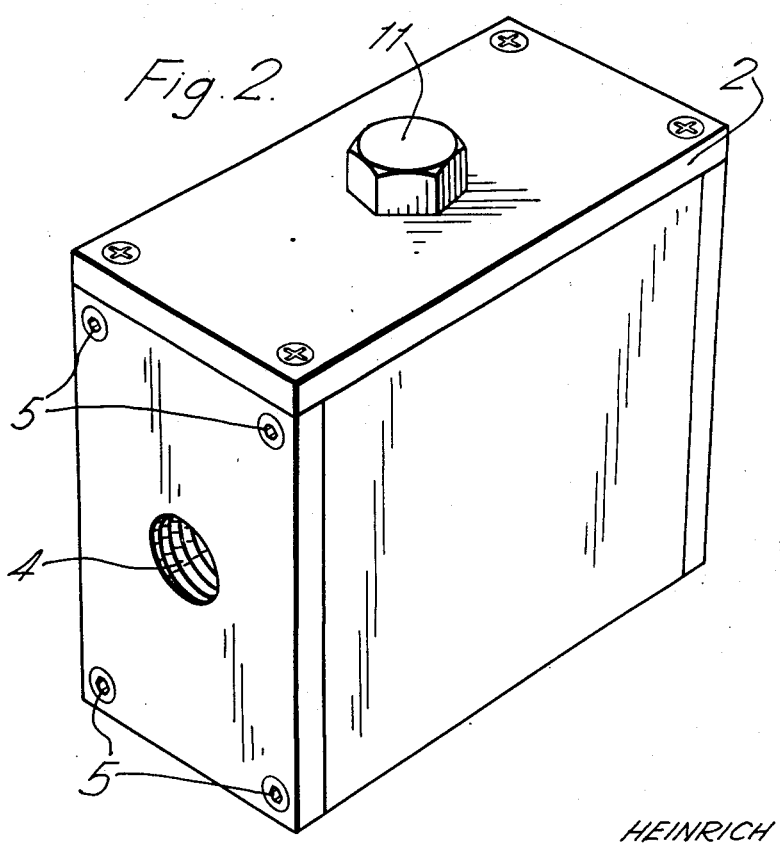
FIG. 2 is a perspective view of the outer shape of this filter.

DESCRIPTION OF THE PREFERRED EMBODIMENT:

With reference to FIGS. 1 and 2, it will be seen that filter housing 1 is formed as a rectangular prism or column, closed at its upper end by a cover plate 2. The front and back sides are provided by rectangular plates, fastened to other walls of the housing by bolts 5. These walls have threaded openings 3 and 4 respectively, which lead to inlet and outlet chamber, 6 and 7, formed on one hand by outer walls of housing 1 and on the other hand by a semi-circular wall 8. This latter wall surrounds, for example, a magnetic filter body 9. In semi-circular walls 8, inlet and outlet slots 10 are formed, running in the longitudinal direction of magnetic filter body 9. The magnetic filter body 9 is placed centrally with respect to semi-circular walls 8.

The filter can be secured to cover plate 2, so that it is necessary only to remove cover plate 2 and filter 9 when the magnetic filter body has to be cleaned. The filter body can be secured to the cover plate by means of a screw 11, pressing a shoulder of filter 9 against the underside of cover plate 2. Other fasteners and other filters can also be used and magnetic filter body 9 can be made in various shapes, within the scope of the invention. Inlet and outlet chamber 6 and 7 and their closure can also be modified and it is within the scope of the invention to use a filter body which employs other types of filtering means than the described magnetic filter body 9, for example a mechanical filter cartridge.

The inner structure of the filter housing which has not been shown in detail is usually formed to accommodate the filtering cartridge used. The cover plate becomes attached to the small cover surface of a square column and has the inlet aperture formed therein along with the filtering cartridge secured thereto in a removable fashion. The other small cover surface carries the outlet aperture.

From the above, it is apparent that, although the invention has been described hereinbefore with respect to a certain specific embodiment, it is evident that many modifications and changes may be made without departing from the spirit of the invention. Accordingly, by the appended claims, we intend to cover all such modifications and changes as fall within the true spirit and scope of this invention.

What is claimed is:

1. A device for filtering a flowing fluid comprising an outer housing having planar exterior surfaces, a fluid inlet and a fluid outlet through opposed sides of the housing, within the outer housing a cylindrical inner housing having an axis substantially parallel to the planes of the opposed sides, cylindrical filter means concentrically arranged within the inner housing, substantially facing the fluid inlet through the outer housing, an axial fluid inlet slot through the inner housing, and substantially facing the fluid outlet through the outer housing, an axial fluid outlet slot through the inner housing.

2. A device according to claim 1, in which the cross-section of the outer housing in a plane perpendicular to the axis of the inner housing is rectangular.

3. A device according to claim 1, in which one side of the outer housing is in the form of a removable cover and the filter element is attached to and removable with the cover.

* * * * *